April 24, 1956     H. WOMMELSDORF     2,742,795
SWITCHING MECHANISM FOR AUTOMATIC MACHINE TOOLS
Filed July 2, 1953
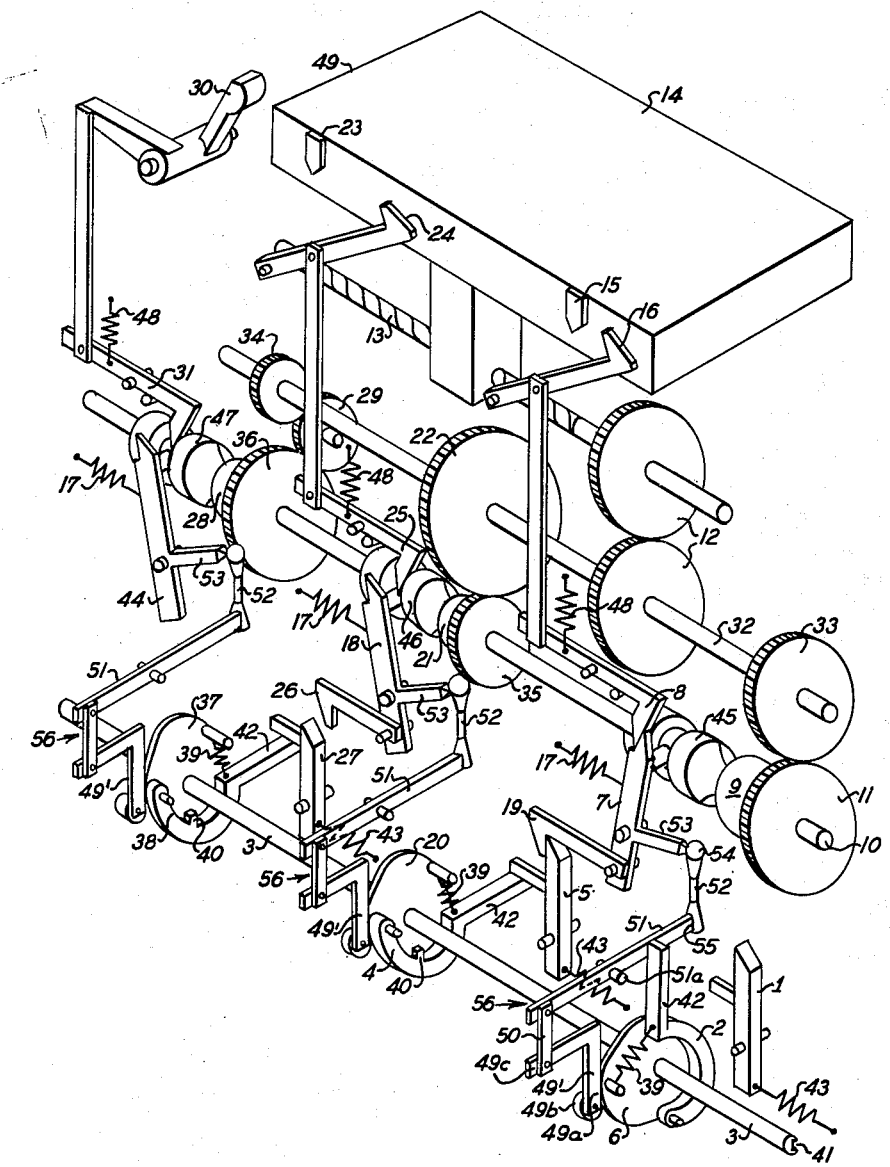

United States Patent Office 2,742,795
Patented Apr. 24, 1956

2,742,795

SWITCHING MECHANISM FOR AUTOMATIC MACHINE TOOLS

Hans Wommelsdorf, Wiesbaden, Germany, assignor to Fritz Werner Aktiengesellschaft, Berlin-Marienfelde, Germany Application July 2, 1953, Serial No. 365,732

4 Claims. (Cl. 74—335)

For the control of the automatic initiation of several different operations on automatic machine tools, for example the different operations of an automatic lathe, there are generally used control cams which however can only with difficulty be changed over to another operation and the use of which can only be justified where there are a great number of finishing tasks. For automatic machine tools, which require relatively frequent operational adjustment, there have therefore been developed electrical or hydraulic control apparatus, the changeover of which is effected by abutments, but which necessitate an expensive switching system. It has also already been proposed to use mechanically controlled clutches, controlled by abutments. These clutches, however, require great switching forces, which are not always available and which in addition lead to inaccuracies in the switching operations.

The invention relates to a new mechanically initiatable switching system for controlling the automatic initiation of several successive operations on automatic machines, more particularly on automatic machine tools, which becomes operative by the release of switching means which oppose only slight resistance to the switching operation and therefore have great accuracy of switching and release sufficiently great switching force to actuate mechanical clutches and store up forces which disengage the said clutches when the next switching operation is initiated.

According to the invention, in a switching mechanism for the control of the automatic initiation of several successive operations of automatic machine tools, wherein each successive operation is switched-in by the switching off of the previous operation, the clutch members for the individual operations can be moved against spring action into the engagement position by switching members adapted to be switched-in to a control shaft and can be maintained in the engaged position by locking members adapted to be lifted out of engagement by the driven portion of the machine, and the clutch members carry initiation members for the switching-in member of the switching member of the succeeding operation, the said initiating members becoming operative when the said clutch members return to the disengaged position.

The switching members expediently consist of cams of the control shaft which are associated with the individual clutch members, the cams being adapted to be coupled with the control shaft by means of spring-loaded pawls and to be disengaged by locking levers which are under spring action, release pawls being arranged on the clutch levers in such a manner as to free the locking levers for the preceding operation from the pawls when the clutch levers return to the disengaged position.

By this construction there is provided a fully automatic switching mechanism operating in a purely mechanical manner and without additional switching power, for by each switching operation spring forces are stored up or released which when one operation is switched off switch-in the succeeding operation.

It can be pre-determined which operation is to be switched-in after the preceding operation has ended, the initiating members for the succeeding operation which become effective when the coupling members of the one operation return to the disengagement position being fashioned so as to be selectively adjustable to the switching-in members of different operations.

The invention is described in more detail in the following with reference to the constructional example illustrated schematically in the drawing.

The example relates to the control of a reciprocating table 14 of a machine tool which is fed to the right at two different speeds and has then to return once more to the left starting position. The table 14 is, for this purpose, guided on a spindle 13 which is adapted to be driven by an intermediate shaft 32 by way of a pair of gear wheels 12. The intermediate shaft 32 carries three gear wheels 33, 22 and 34, of which the gear wheels 33, 22 are respectively in engagement with gear wheels 11, 35. The said gear wheels 11, 35 are rotatably and non-fixedly mounted on the drive shaft 10. The gear wheel 34 is connected by way of a reversing wheel 29 to a gear wheel 36 which is also disposed non-fixedly on the shaft 10. The three gear wheels 11, 35, 36 can be connected to the shaft 10 by clutches 9, 21, 28, so that according to which of the gear wheels 11, 35, 36 is coupled-in the machine table is fed rapidly or slowly to the right or returned to the left.

The switching-in and -out of the clutches 9, 21, 28 is effected by a control shaft 3 which is driven by the main shaft 10 in a manner not shown and on which there is rotatably disposed non-fixedly three cam-plates 6, 20, 37. Each cam-plate 6, 20, 37 is provided with a rocking lever 2, 4, 38, which is held on the control shaft 3 by a spring 39. Each of the rocking levers 2, 4, 38 has a projection 40 with which there is associated a recess 41 in the shaft 3, so that the cam plates 6, 20, 37 can be coupled to the shaft 3 by way of the rocking levers 2, 4, 38.

The ends 42 of the levers 2, 4, 38 are radially outwardly directed, and with the said ends there are associated pawls 1, 5, 27 which, when the ends 42 rise upwards, engage behind the said ends and thereby lift the levers 2, 4, 38 with the projections 40 out of the shaft 3. The pawls 1, 5, 27 are acted upon by the springs 43.

Each of the three cam-plates 6, 20, 37 controls a clutch arm 7, 18, 44, which carry the clutch pieces 45, 46, 47 for the clutches 9, 21, 28. The clutch arms 7, 18, 44 are acted upon by springs 17 in such a manner as to hold the clutch parts 45, 46, 47 in the non-engaged position.

The two clutch arms 7, 18 each carry a locking pawl 19, 26 which serve to operate the pawls 5, 27 which determine the successive operation in each case.

In the closed position the clutch arms 7, 18, 44 are held by pawls 8, 25, 31 which are disengaged by control levers 16, 24, 30 against the action of springs 48. The actuation of the control levers 16, 24, 30 is effected by abutments 15, 23 of the machine table 14 or the end surface 49 thereof.

Each clutch arm is connected with the corresponding cam by means of an intermediate linkage generally denoted by 56. An angular lever 49' is arranged so as to be adjacent to the respective cam plate 6, 20, 37 with a roller 49b carried by the arm 49a thereof. The outer arm 49c of the angular lever 49' is connected by a link 50 with a two-armed lever 51 pivotally arranged for a swinging motion about the pivot 51a.

In the constructional example it is assumed that the table 14 is to carry out only one feed and return each time. Accordingly there is provided for the rocking lever 2 of the cam-plate 6 initiating the first operation a hand-operated release pawl 1. For a continuous working operation, however, the clutch arm 44 can further be provided with a locking pawl (not shown) for controlling the pawl 1.

In order to initiate a working operation the pawl 1 is lifted by hand so that with the rotation of the shaft 3 the projection 40 of the lever 2 falls into the recess 41 of the shaft 3 and thereby couples up the cam-plate 6 with the said shaft for rotation. After one rotation, the pawl 1 which has meanwhile returned to its normal position once more lifts the rocking lever 2 out of the shaft 3. The cam-plate 6 rotating in clockwise direction acts over the roller 49a abutting against the same on the angular lever 49' and through the link 50 on the lever 51 which rocks therefore about the pivot 51a thereof in clockwise direction so that the shaft 52 is moved downward and pulls over the lever 53 the clutch arm 7 into a position coupling the clutch parts 54, 9 so that the gear wheel 11 is coupled with the drive shaft 10. The machine table 14 is thereby fed to the right at a high speed by way of the gear wheels 11, 33, the shaft 32, the pair of gear wheels 12 and the spindle 13.

The rocking levers 4, 38 of the two other cam-plates 20, 27 are meanwhile not connected-up with the shaft 3. The clutch arm 7 is held in the engaged position by the engaging pawl 8, while the cam-plate 6 after one rotation is again uncoupled from the shaft 3 by the pawl 1.

When the abutment 15 of the table 14 comes up against the control lever 16 the pawl 8 is lifted out of the clutch arm 7 which is then returned to the normal position by the action of the spring 17 and disengages the gear wheel 11 from the drive shaft 10.

When however the clutch arm 7 went over into the working position the pawl 19 arranged thereon engaged the pawl 5. As soon as the abutment 15 coming up against the control lever 16 causes the clutch arm 7 to return to the normal position, the pawl 19 carries the pawl 5 along with it so that the said pawl 5 is released from the rocking lever 4. The said rocking lever engages with the control shaft 3 by way of the projection 40 so that the cam-plate 20 is carried round by the shaft 3 for one rotation and in so doing closes the coupling 46, 21 by way of linkage 56 and the clutch arm 18. The clutch arm 18 is held by the pawl 25 in the closed position and the table 14 continues its feed movement to the right at a slow speed, until the abutment 23 lifts the lever 24, 25 out of engagement, so that the clutch arm 18 returns to the normal position and the feed movement of the table 14 is halted.

When the arm 18 is moved into the coupled-up position, however, the pawl 26 has engaged over the pawl 27 so that when the clutch arm 18 returns to the normal position the pawl 27 is lifted off by the lever 38. Accordingly, by way of the cam-plate 37, the intermediate linkage 56 and the arm 44 the clutch 47, 28 is coupled-up and the table is returned to the left until the table end 49, by abutting against the control lever 30, disengages the pawl 31 from the arm 44, whereby the system comes to a halt, unless as mentioned in the foregoing the pawl 1 is not once more disengaged by an engaging device arranged on the clutch arm 44.

In the same way a plurality of switching cams (not shown) can be successively connected, each of them switching-in an operation.

The manner of the operations is as desired, and it is not only possible with the new control apparatus to move a table of a machine tool, but also to bring various tools (not shown) into successive operation on a stationary workpiece (not shown).

The pawls 19, 26 for initiating the succeeding operations may be selectively adjustable to various pawls 1, 5, 27 and a pawl (not shown) can also be associated with the clutch lever 44 of the last working step.

The construction of the new switching mechanism can of course be modified in many ways as regards the construction of the single-revolution clutches, control cams and switching-in levers.

I claim:

1. A switching mechanism for automatic machine tools, comprising, in combination, a table carrying out a reciprocating motion, clutch means associated with said table, resilient means for holding said clutch means in a predetermined operative position thereof, locking means for locking said clutch means in the operative positions thereof, pawl means forming part of said means for locking said clutch means, a plurality of abutments on said table cooperating with said pawl means so as to bring the same into the non-operative positions thereof, cam means connected with said clutch means so as to bring the same into the operative positions thereof, a control shaft loosely connected with said cam means, said control shaft being arranged for carrying out a constant number of revolutions per minute, means for arbitrarily coupling said cam means with said control shaft for one revolution thereof, releasing means controlling said means for coupling said cam means and said control shaft for one revolution thereof, and a plurality of pawls cooperating with said releasing means, said clutch means being arranged so as to be simultaneously uncoupled during a predetermined operation thereof and coupled for the subsequent operation thereof.

2. A switching mechanism as claimed in claim 1, said pawls having each a projection, and a plurality of springs for holding said projections on said control shaft, said control shaft having an axial groove adapted to accommodate said projections on said control shaft.

3. A switching mechanism as claimed in claim 2, a plurality of locking levers resiliently held in the path of rotation of said cam means, said pawls being disengageable from said control shaft by said locking levers, and a plurality of release pawls arranged on said clutch means so as to free said locking levers for the preceding operation from said pawls when said clutch means return to the inoperative position thereof.

4. A switching mechanism as claimed in claim 3, and means for changing over said release pawls to any one of said locking levers.

References Cited in the file of this patent

UNITED STATES PATENTS

| | | |
|---|---|---|
| 700,981 | De Ploeg | May 27, 1902 |
| 815,642 | Sears | Mar. 20, 1906 |
| 1,043,931 | Herrick | Nov. 12, 1912 |
| 2,044,599 | Weinreich et al. | June 16, 1936 |
| 2,493,738 | Cuttat | Jan. 10, 1950 |